United States Patent
Haataja (10) Patent No.: US 6,843,946 B1
(45) Date of Patent: Jan. 18, 2005

(54) STEPPED PUNCH FOR FORMING HOLES IN MOLDED WOOD STRAND PARTS

(75) Inventor: Bruce A. Haataja, Lake Linden, MI (US)

(73) Assignee: GFP Strandwood Corp., Hancock, MI (US)

( * ) Notice: Subject to any disclaimer, the term of this patent is extended or adjusted under 35 U.S.C. 154(b) by 143 days.

(21) Appl. No.: 10/333,280

(22) PCT Filed: Jul. 31, 2000

(86) PCT No.: PCT/US00/20880
§ 371 (c)(1),
(2), (4) Date: Jan. 16, 2003

(87) PCT Pub. No.: WO02/09921
PCT Pub. Date: Feb. 7, 2002

(51) Int. Cl.$^7$ .............................. B29C 43/36; C08J 5/04
(52) U.S. Cl. ...................... 264/109; 264/118; 264/155; 425/406; 425/412
(58) Field of Search ................................ 264/109, 113, 264/118, 155; 425/406, 412, 414, 468, 469

(56) References Cited

U.S. PATENT DOCUMENTS

| | | | |
|---|---|---|---|
| 3,164,511 A | 1/1965 | Elemendorf | |
| 3,238,281 A | 3/1966 | Kato | |
| 3,413,694 A | * 12/1968 | Thomas | ...................... 425/414 |
| 4,131,705 A | 12/1978 | Kubinsky | |
| 4,213,928 A | 7/1980 | Casselbrant | |
| 4,241,133 A | 12/1980 | Lund et al. | |
| 4,246,310 A | 1/1981 | Hunt et al. | |
| 4,248,163 A | 2/1981 | Caughey | |
| 4,248,820 A | 2/1981 | Haataja | |
| 4,337,710 A | 7/1982 | Haataja et al. | |
| 4,384,019 A | 5/1983 | Haataja | |
| 4,408,544 A | 10/1983 | Haataja | |
| 4,440,708 A | 4/1984 | Haataja et al. | |
| 4,469,216 A | 9/1984 | Haataja et al. | |
| 4,790,966 A | 12/1988 | Sandberg et al. | |
| 4,960,553 A | 10/1990 | DeBruine et al. | |
| 5,397,228 A | * 3/1995 | Metten | ........................ 425/414 |

* cited by examiner

Primary Examiner—James P. Mackey
(74) Attorney, Agent, or Firm—Price, Heneveld, Cooper, DeWitt & Litton, LLP (57) ABSTRACT

A mold for forming wood flakes into a molded wood flake part including a top mold die and a bottom mold die. The top mold die includes a punch for forming a hole in the part, and the bottom mold die includes a punch receiving aperture. The punch includes a tapered upper portion and a cylindrical lower portion for forming the hole in molded parts of varying thicknesses. The punch includes a tapered upper section defining an upper opening of a first radius in a top surface of the molded part and a cylindrical lower section defining an opening of a second radius in a bottom surface of the molded part. The cylindrical lower portion is sufficiently long that the bottom opening in the hole in each part formed will have the same second radius.

11 Claims, 4 Drawing Sheets

STEPPED PUNCH FOR FORMING HOLES IN MOLDED WOOD STRAND PARTS

BACKGROUND OF THE INVENTION

A. Field of the Invention

The present invention relates to wood flake molding.

B. Background of the Art

Wood flake molding, also referred to as wood strand molding, is a technique invented by wood scientists at Michigan Technological University during the latter part of the 1970s for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.030 inches; and an average width of 3 inches or less, most typically 0.25 to 1.0 inches, and never greater than the average length of the flakes. These flakes are sometimes referred to in the art as "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e., non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted mat is then covered with another metal tray, and the covered metal tray is used to carry the mat to a mold. (The terms "mold" and "die", as well as "mold die", are sometimes used interchangeably herein, reflecting the fact that "dies" are usually associated with stamping, and "molds" are associated with plastic molding, and molding of wood strands does not tit into either category.) The top metal tray is removed, and the bottom metal tray is then slid out from underneath the mat, to leave the loosely felted mat in position on the bottom half of the mold. The top half of the mold is then used to press the mat into the bottom half of the mold at a pressure of approximately 600 psi, and at an elevated temperature, to "set" (polymerize) the MDI binder, and to compress and adhere the compressed wood flakes into a final three-dimensional molded part. The excess perimeter of the loosely felted mat, that is, the portion extending beyond the mold cavity perimeter, is pinched off where the part defining the perimeter of the upper mold engages the part defining the perimeter of the lower mold cavity. This is sometimes referred to as the pinch trim edge.

U.S. Pat. Nos. 4,440,708 and 4,469,216 disclose this technology. The drawings in U.S. Pat. No. 4,469,216 best illustrate the manner in which the wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence which hold them together in the loosely felted mat. The drawings of U.S. Pat. No. 4,440,708 best illustrate the manner in which a loosely felted mat is compressed by the mold halves into a three-dimensionally configured article (see FIGS. 2–7, for example).

This is a different molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

Some parts are designed with holes in them, for example, for receiving so called "T" nuts. T nuts comprise an annular flange with one or more barbs projecting therefrom for anchoring the T nut in the surface of the part, and with an internally threaded sleeve extending perpendicularly from the annular flange. Thus, the hole in the part must extend perpendicularly back from the surface of the part. Such holes may also be required for other purposes.

While such holes can be drilled into a molded wood strand part after it is molded, it would be preferable to mold the holes into the part as part of the molding process. To do so, the mold cavity is provided with a punch projecting from one surface thereof, and a hole defining punch receiving insert in the opposite mold cavity surface, such that as the upper and lower mold halves, or platens, are closed, the punch pushes through the loosely felted mat, pushing wood flakes aside or bending them in the direction of the punch, such that as the binder cures, a hole is formed around the punch.

Heretofore, the holes have been with a punch having a tapered outer surface that pushes past and through the wood strands in the felted, mat. The punch is tapered to facilitate its removal from the molded part. However, due to the nature of wood strand molding, the final molded part can vary ill thickness. The mats can be compressed to varying thicknesses by the mold die, due to unavoidable inconsistencies from mat to mat, springs back of the mat, overcompression, or file like. Therefore, the dimensions of an opening on one side of a molded hole formed by a tapered punch can vary with variations in the final thickness of the part, depending on the distance the tapered punch extends through the molded part. Therefore, while the openings on one side of a hole may have the same radius for all molded parts using that punch, the openings on the other side of the hole will have varying radii, depending on the thickness of the molded part.

SUMMARY OF THE INVENTION

In the wood flake molding process and apparatus of the present invention, the punch for forming holes in the part includes a tapered upper portion to facilitate mold release, but a cylindrical lower portion for forming a hole of consistent dimensions in parts of varying thicknesses. The tapered upper portion is configured to extend sufficiently far into the molded wood flake part to facilitate withdrawal of the punch from the hole formed therein. The cylindrical lower portion is sufficiently long that regardless of variations in part thickness, the bottom opening in the hole in each part formed will have the same radius, defined by the cylindrical lower portion.

The mold is efficient in use, economical to manufacture, capable of a long life, and particularly adapted for the proposed use.

These and other features, advantages and objects of the present invention will be further understood and appreciated by those skilled in the art by reference to the following specification and claims.

BRIEF DESCRIPTION OF THE DRAWINGS

FIG. 1 is a side elevational cross sectional view of the spaced upper and lower mold halves with a loosely felted mat of wood flakes positioned there between.

DETAILED DESCRIPTION OF THE PREFERRED EMBODIMENTS

Figure 1:
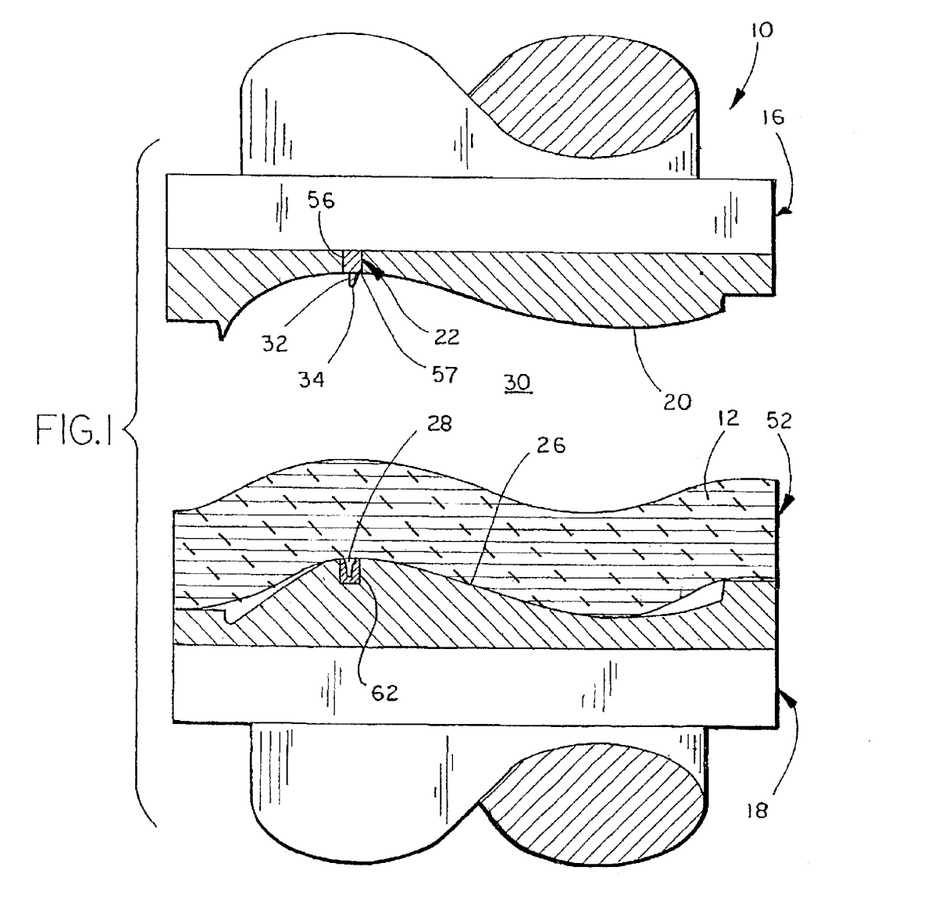

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
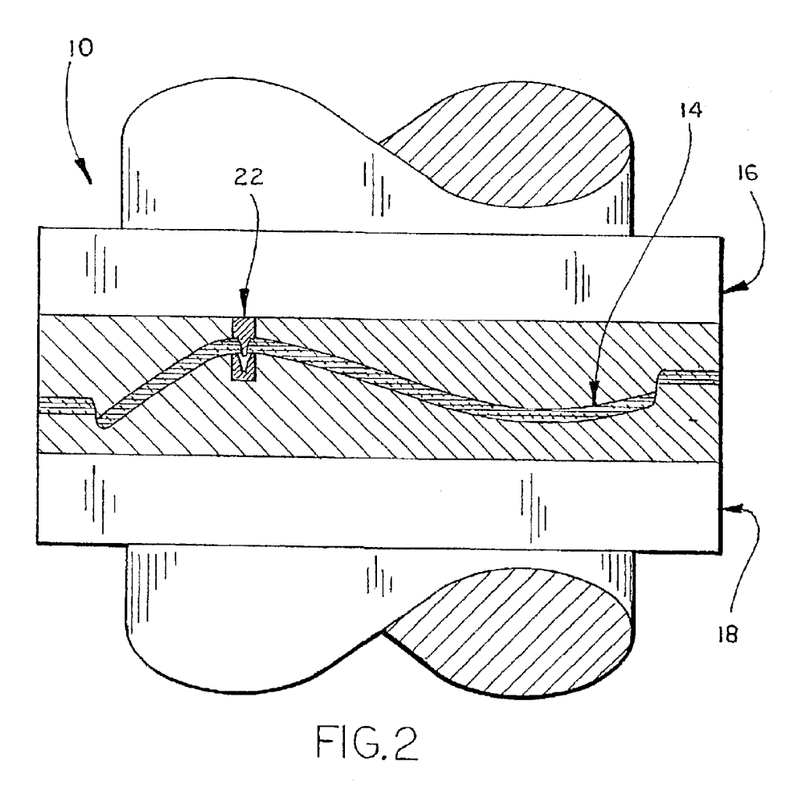
FIG. 2 is the same view of FIG. 1 with the mold closed, whereby the wood flakes are consolidated, compressed, and cured under beat and pressure to form a molded wood flake part.

The reference number 10 (FIG. 1) generally designates a mold of the present invention. The mold 10 is used in a method of forming wood flakes 12 into a molded wood flake part 14 (FIG. 2). The mold 10 includes a top mold die 16 and a bottom mold die 18. The top mold die 16 includes a surface 20 and a punch 22 extending from the surface 20 for forming a hole 24 (see FIG. 4) in the part 14, and the bottom mold die 18 includes a surface 26 having a punch receiving aperture 28. The surface 20 of the top mold die 16 and the surface 26 of the bottom mold die 18 define a cavity 30 therebetween. The punch 22 projects into the cavity 30 from the surface 26 of the top mold die 16, and includes a tapered upper portion 32 and a cylindrical lower portion 34 for forming the hole 24 in molded wood flake parts 14 of varying thicknesses. The tapered upper portion 32 is configured to extend sufficiently far into molded wood flake part 14 to facilitate withdrawal of the punch 22 from the hole 24 formed therein. The cylindrical lower portion 34 is sufficiently long that regardless of variations in part thickness, the bottom opening 46 in each part 14 formed will have the same second radius 48, defined by the cylindrical lower portion 34.

In the illustrated example, the molded wood flake part 14 is made by positioning a loosely felted mat 52 of wood flakes 12 on the bottom mold die 18 (FIG. 1). The top mold die 16 and the bottom mold, die 18 are then brought together (FIG. 2) and heat and pressure are applied to the felted mat 52. The felted mat 52 is thereby compressed and cured into the molded wood flake part 14 having the hole 24 formed therein by the punch 22 passing through the mat 52 and forcing the wood flakes 12 down into the punch receiving aperture 28. Although only one punch 22 is shown in the illustrated example, a plurality of punches could be used to form a plurality of holes in the molded wood flake part 14.

The illustrated mold 10 (FIG. 3) includes a base 54, the tapered upper portion 32 and the lower cylindrical portion 34. The base 54 is inserted into a receiving socket 56 (see FIG. 1) in the top mold die 16, as, for example, by threading into the socket 56. The base 54 includes a base face 57 that is generally aligned with the surface 20 of the top mold die 16. The tapered upper portion 32 has a generally frusto-conical configuration with a larger diameter of the tapered upper portion 32 connected to the base 54. The cylindrical lower portion 34 of the punch 22 extends from the tapered upper portion 32. Preferably, the cylindrical lower portion 34 has about the same vertical length as the tapered upper portion 32. The cylindrical lower portion 34 of the punch 22 is designed to extend downwardly into the punch receiving aperture 28 located in the bottom mold die 18.

Figures 3, 4:
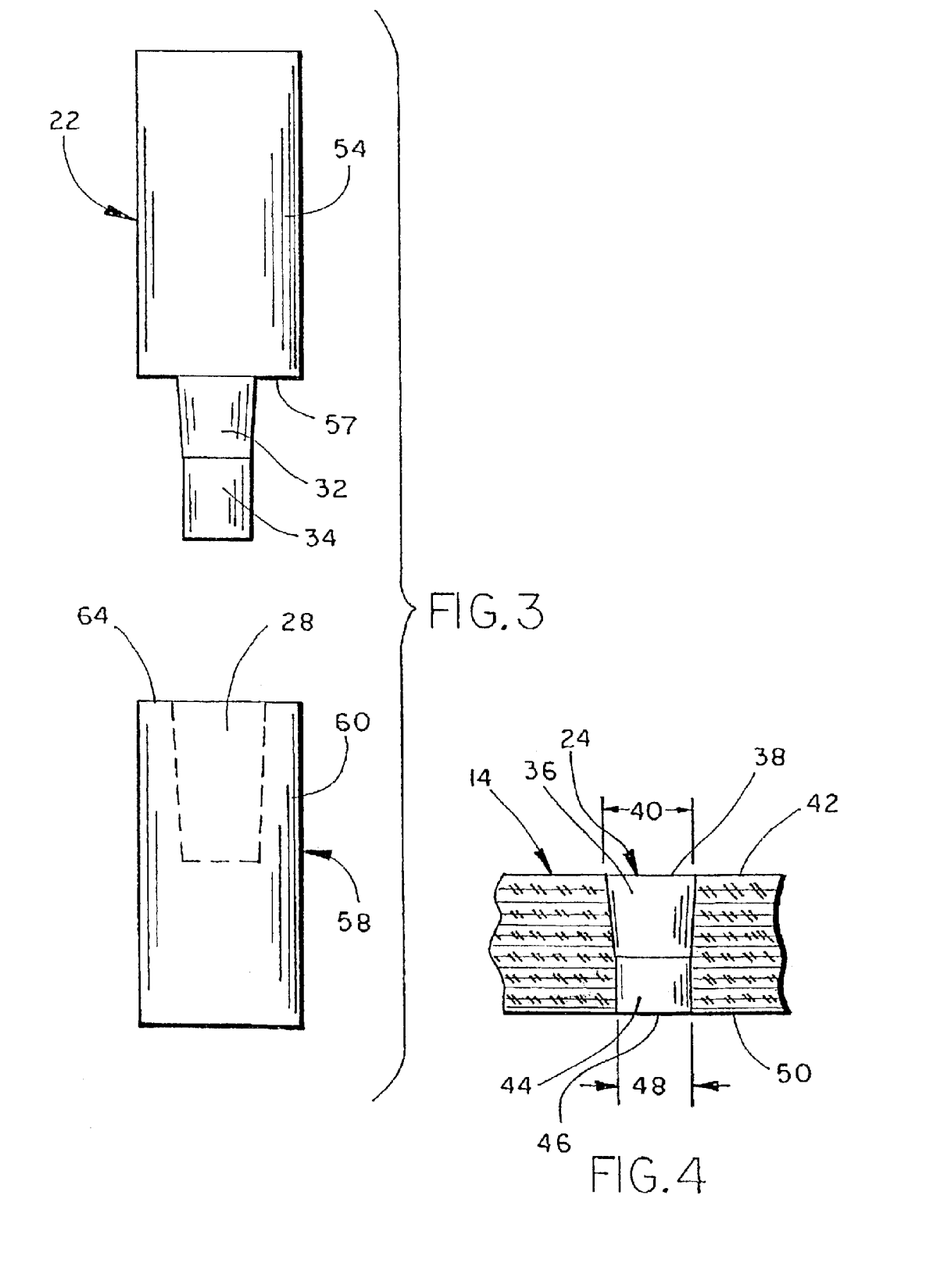
FIG. 3 is a side elevational view of a punch and a punch receiving aperture in a punch receiving insert used to accept the punch during molding of the molded wood flake part.
FIG. 4 is a partial, cross-sectional view of the molded wood flake part.

In the illustrated example, the punch receiving aperture 28 is located in a punch receiving insert 58 (FIG. 3) positioned in the bottom mold die 18. The punch receiving insert 58 includes a body 60 which is inserted into and secured in a socket 62 in bottom mold die 18 in the same manner that the base 54 of the punch 22 is inserted into and secured in the receiving socket 56 in top mold die 16. In addition to the punch receiving aperture 28, the punch receiving insert 58 includes a top face 64 which is intended to align with the surface 26 of the bottom mold die 18 and the base face 57 of the base 54 of the punch 22. As can be seen in FIG. 3, the punch receiving aperture 28 in the punch receiving insert 58 is tapered downward with horizontal dimensions somewhat larger than the punch 22. This is so the punch receiving aperture 28 will accommodate wood flakes 12 which are pushed downwardly into the punch receiving aperture 28 by the punch 22 as it passes through loosely the felted mat 52. These wood flakes 12 that are pushed down into the punch receiving aperture 28 are referred to as a plug.

The molded wood flake parts 14 made from the mold 10 include the hole 24 (see FIG. 4) that has a tapered upper section 36 defining an upper opening 38 of a first radius 40 in a top surface 42 of the molded wood flake part 14 and a cylindrical lower section 44 defining a bottom opening 46 of a second radius 48 in a bottom surface 50 of the molded wood flake part 14. The shape of the hole 24 formed in the molded wood flake part 14 by the punch 22 is quite different, depending on which side of the molded wood flake part 14 it is viewed from. When viewed vertically from above, the view corresponds to an upper opening 38 defined by the tapered upper section 36 of the hole 24 and the tapered upper portion 32 of the punch 22. In contrast, if the hole 24 is viewed from the other side of the molded wood flake part 14, one sees a bottom opening 46 defined by the cylindrical lower section 44 of the hole 24 and the cylindrical lower portion 34 of the punch 22. However, the shape and size of the upper opening 38 and the shape of the bottom opening 46 will be the same for every molded wood flake part 14 produced regardless of the thickness of the molded wood flake part 14. The only difference between the holes 24 in several molded wood flake parts 14 of varying thicknesses would be that the cylindrical lower section 44 of the holes will have varying lengths. The resulting hole 24 provides a uniform appearance from the surface of the molded wood flake part and facilitates the insertion of a T nut (not shown) from either surface, with its mounting flange and associated bar resting on a surface of the molded wood flake part which has been formed, and with its threaded sleeve projecting inwardly into the hole 24. The width of the hole 24 is sufficiently great throughout its length that it will accommodate a sleeve of a T nut or other item to be inserted into the hole 24, without interference.

Figure 5:
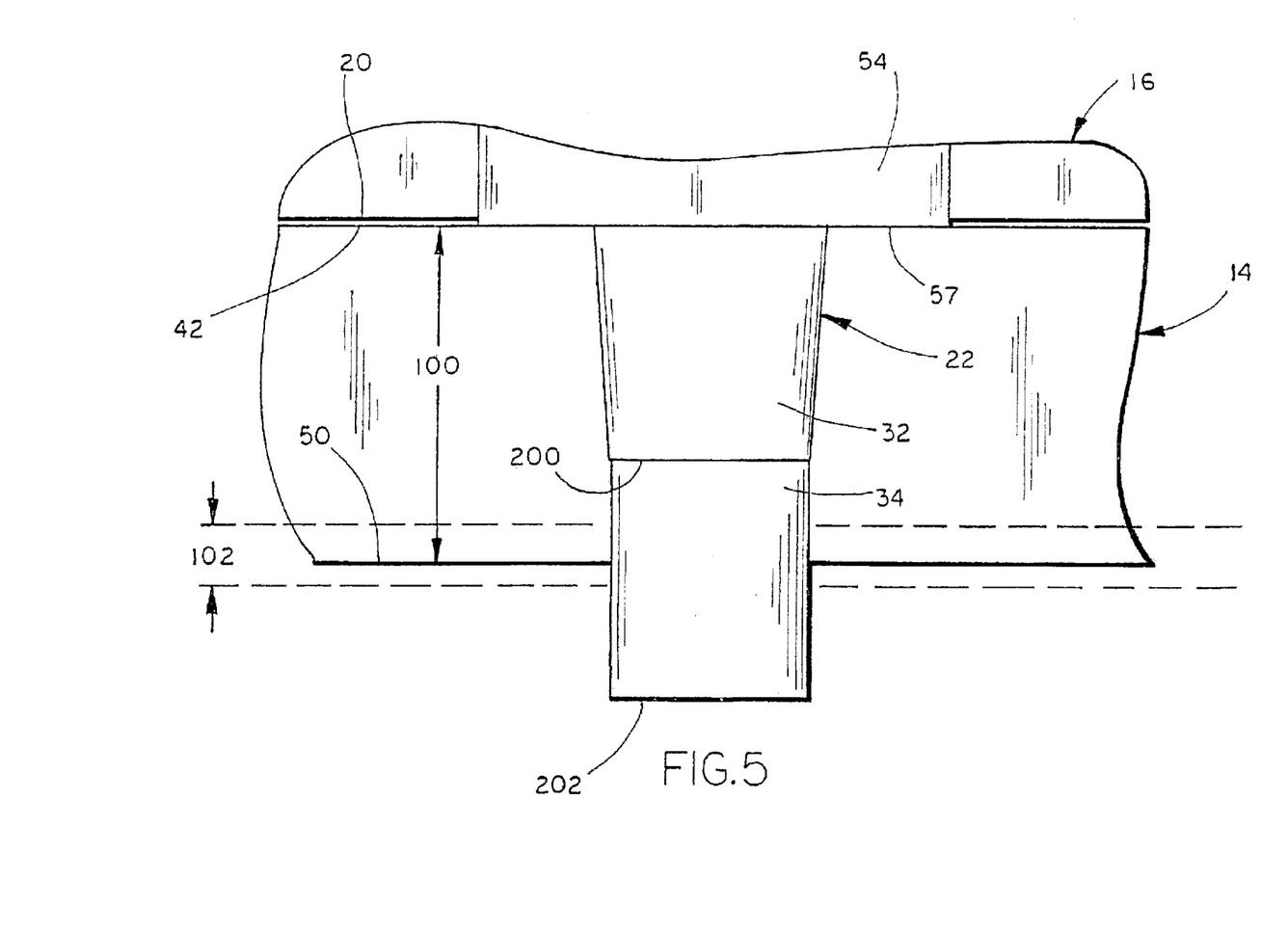
FIG. 5 is a partial side cross-sectional view of a punch and punch base used to form holes in the molded wood flake part with the wood flakes consolidated, compressed and cured into the molded wood flake part.

As seen in FIG. 5, the top surface 42 of the molded wood flake part 14 is adjacent the surface 20 of the top mold die 16 and the bottom surface 50 of the molded wood flake part 14 is adjacent the surface 26 of the bottom mold die 18 after the wood flakes 12 have been consolidated, compressed and cured into the molded wood flake part 14. The molded wood flake parts 14 made in this manner will preferably have a nominal thickness 100. However, the felted mats 52 will be compressed to varying thicknesses by the mold 10, due to unavoidable inconsistencies from mat 52 to mat 52, spring back of the mat 52, overcompression, or the like. Therefore, the bottom surface 50 of the molded wood flake part 14 will be located within a zone of variation in part thickness 102. The zone of variation in part thickness 102 is the area in which the bottom surface 50 of the molded wood flake part 14 could be located, depending on the thickness of the molded wood flake part 14, compared to a stationary position for the top surface 42 of the molded wood flake part 14.

In order to provide a uniform appearance of the hole 24 from the top surface 42 and the bottom surface 50 of the molded wood flake part 14, the punch 22 is configured such that the hole 24 will have the upper opening 38 when viewed from above and the lower opening 46 when viewed from below. Therefore, the tapered upper portion 32 of the punch 22 will always be located above within the nominal thickness 100 of the molded wood flake part 14, but above the zone of variation in part thickness 102. Moreover, the cylindrical lower portion 34 of the punch 22 will always have an upper end 200 within the nominal thickness 100 of the molded wood flake part 14 but at or above the top limit of the zone of variation in part thickness 102 and a lower end 202 below the lower limit of the zone of variation in part thickness 102, and extending beyond the surface of bottom mold die 18, into aperture 28 in punch receiving insert 58. Therefore, every hole 24 made in the molded wood flake part 14 will have the upper opening 38 when viewed from above and the lower opening 46 when viewed from below, as described above. As stated above, the tapered upper portion 32 is configured to extend sufficiently far into the molded part 14 to facilitate withdrawal of the punch 22 from the hole 24 formed therein. The tapered upper section 32 facilitates withdrawal of the punch 22 because of the reduction of friction between the punch 22 of the hole 24, as compared to the friction involved with removing a cylindrical punch from a circular hole. The tapered upper section 32 therefore should extend from the surface 20 of the top mold die 16 to a location slightly above the zone of variation in part thickness 102. For example, if the desired length of the hole 24 is ½", the tapered upper portion 32 of the punch 22 could have a length of ⅜" and the cylindrical lower portion 34 of the punch 22 could have a length of ⅜" creating a hole 24 with a tapered upper section 36 having a length of ⅜' and a cylindrical lower section 44 having a length of ⅛", since the remaining ¼" of the punch projects into aperture 28 in punch receiving insert 58.

The wood flakes 12 used in creating the molded wood flake part 14 can be prepared from various species of suitable hardwoods and softwoods used in the manufacture of particleboard. Representative examples of suitable woods include aspen, maple, oak, elm, balsam fir, pine, cedar, spruce, locust, beech, birch and mixtures thereof. Aspen is preferred.

Suitable wood flakes 12 can be prepared by various conventional techniques. Pulpwood grade logs, or so called round Wood, are converted into wood flakes 12 in one operation with a conventional roundwood flaker. Logging residue or the total, tree is first cut into fingerlings in the order of 2–6 inches long with a conventional device, such as the helical comminuting shear disclosed in U.S. Pat. No. 4,053,004, and the fingerlings are flaked in a conventional ring-type flaker. Roundwood wood flakes 12 generally are higher quality and produce stronger parts because the lengths and thickness can be more accurately controlled. Also, roundwood wood flakes 12 tend to be somewhat flatter, which facilitates more efficient blending and the logs can be debarked prior to flaking which reduces the amount of less desirable fines produced during flaking and handling. Acceptable wood flakes 12 can be prepared by ring flaking fingerlings and this technique is more readily adaptable to accept wood in poorer form, thereby permitting more complete utilization of certain types of residue and surplus woods.

Irrespective of the particular technique employed for preparing the wood flakes 12, the size distribution of the wood flakes 12 is quite important, particularly the length and thickness. The wood flakes should have an average length of about 1¼ inch to about 6 inches and an average thickness of about 0.005 to about 0.075 inches. The average length of the wood flakes is preferably about 2 to about 3 inches. In any given batch, some of the wood flakes 12 can be shorter than 1¼ inch, and some can be longer than 6 inches, so long as the overall average length is within the above range. The same is true for the thickness.

The presence of major quantities of wood flakes 12 having a length shorter than about 1¼ inch tends to cause the felted mat 52 to pull apart during the molding step. The presence of some fines in the felted mat 52 produces a smoother surface and, thus, may be desirable for some applications so long as the majority of the wood flakes, preferably at least 75%, is longer than 1⅛ inch and the overall average length is at least 1¼ inch.

Substantial quantities of wood flakes 12 having a thickness of less than about 0.005 inches should be avoided, because excessive amounts of binder are required to obtain adequate bonding. On the other hand, wood flakes 12 having a thickness greater than about 0.075 inch are relatively stiff and tend to overlie each other at some incline when formed into the felted mat 52. Consequently, excessively high mold pressures are required to compress the wood flakes 12 into the desired intimate contact with each other. For wood flakes 12 having a thickness falling within the above range, thinner ones produce a smoother surface while thick ones require less binder. These two factors are balanced against each other for selecting the best average thickness for any particular application. The average thickness of the wood flakes 12 preferably is about 0.015 to about 0.25 inches, and more preferably about 0.0020 inch.

The width of the wood flakes 12 is less important. The wood flakes 12 should be wide enough to ensure that they lie substantially flat when felted during mat formation. The average width generally should be about 3 inches or less and no greater than the average length. For best results, the majority of the wood flakes 12 should have a width of about $\frac{1}{16}$ inch to about 3 inches, and preferably 0.25 to 1.0 inches.

The blade setting on a flaker can primarily control the thickness of the wood flakes 12. The length and width of the wood flakes 12 are also controlled to a large degree by the flaking operation. For example, when the wood flakes 12 are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure that the average length, thickness and width of the wood flakes 12 are within the desired ranges. When roundwood flaking is used, both screen and air classification usually are required to adequately remove both the undersize and oversize particles, whereas fingerling wood flakes 12 usually can be properly sized with only screen classification.

Wood flakes 12 from some green wood can contain up to 90% moisture. The moisture content of the mat must be substantially less for molding as discussed below. Also, wet wood flakes 12 tend to stick together and complicate classification and handling prior to blending. Accordingly, the wood flakes 12 are preferably dried prior to classification in a conventional type drier, such as a tunnel drier, to the moisture content desired for the blending step. The moisture content to which the wood flakes 12 are dried usually is in the order of about 6 weight % or less, preferably about 2 to about 5 weight %, based on the dry weight of the wood flakes 12. If desired, the wood flakes 12 can be dried to a moisture content in the order of 10 to 25 weight % prior to classification and then dried to the desired moisture content for blending after classification. This two-step drying may reduce the overall energy requirements for drying wood flakes 12 prepared from green woods in a manner producing substantial quantities of particles which must be removed during classification and, thus, need not be as thoroughly dried.

To coat the wood flakes 12 prior to being placed as a felted mat 52 within the cavity 30 within the mold 10, a known amount of the dried, classified wood flakes 12 is introduced into a conventional blender, such as a paddle-type batch blender, wherein predetermined amounts of a resinous particle binder, and optionally a wax and other additives, is applied to the wood flakes 12 as they are tumbled or agitated in the blender. Suitable binders include those used in the manufacture of particle board and similar pressed fibrous products and, thus, are referred to herein as "resinous particle board binders." Representative examples of suitable binders include thermosetting resins such as phenolformaldehyde, resorcinol-formaldehyde, melamine-formaldehyde, urea-formaldehyde, urea-furfuryl and condensed furfuryl alcohol resins, and organic polyisocyantes, either alone or combined with urea- or melamine-formaldehyde resins.

Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethene triisocyanates, diphenylether-2,4,4'-triisoccyanate and polyphenylpolyisocyanates, particularly diphenylmethane4, 4'-diisocyanate. So-called MDI is particularly preferred.

The amount of binder added to the wood flakes 12 during the blending step depends primarily upon the specific binder used, size, moisture content and type of the wood flakes 12, and die desired characteristics of the part being formed. Generally, the amount of binder added to the wood flakes 12 is about 2 to about 15 weight %, preferably about 4 to about 10 weight %, as solids based on the dry weight of the wood flakes 12. When a polyisocyanate is used alone or in combination with a urea-formaldehyde resin, the amounts can be more toward the lower ends of these ranges.

The binder can be admixed with the wood flakes 12 in either dry or liquid form. To maximize coverage of the wood flakes 12, the binder preferably is applied by spraying droplets of the binder in liquid form onto the wood flakes 12 as they are being tumbled or agitated in the blender. When polyisocyantes are used), a conventional mold release agent preferably is applied to the die or to the surface of the felted mat prior to pressing. To improve water resistance of the part, a conventional liquid wax emulsion preferably is also sprayed on the wood flakes 12 during the blinding step. The amount of wax added generally is about 0.5 to about 2 weight %, as solids based on die dry weight of the wood flakes 12. Other additives, such as at least one of the following: a coloring agent, fire retardant, insecticide, fungicide, mixtures thereof and the like may also be added to the wood flakes 12 during the blending step. The binder, wax and other additives, can be added separately in any sequence or in combined form.

The moistened mixture of binder, wax and wood flakes 12 or "furnish" from the blending step is formed into a loosely-felled, layered mat 52, which is placed within the cavity 30 prior to the molding and curing of the felted mat 52 into molded wood flake part 14. The moisture content of the wood flakes 12 should be controlled within certain limits so as to obtain adequate coating by the binder during the blending step and to enhance binder curing and deformation of the wood flakes 12 during molding.

The presence of moisture in the wood flakes 12 facilitates their bending to make intimate contact with each other and enhances uniform heat transfer throughout the mat during the molding step, thereby ensuring uniform curing. However, excessive amounts of water tend to degrade some binders, particularly urea-formaldehyde resins, and generate steam which can cause blisters. On the other hand, if the wood flakes 12 are too dry, they tend to absorb excessive amounts of the binder, leaving an insufficient amount on the surface to obtain good bonding and the surfaces tend to cause hardening which inhibits the desired chemical reaction between the binder and cellulose in the wood. This latter condition is particularly true for polyisocyanate binders.

Generally, the moisture content of the furnish after completion of blending, including the original moisture content of the wood flakes 12 and the moisture added during blending with the binder, wax and other additives, should be about 5 to about 25 weight %, preferably about 8 to about 12 weight %. Generally, higher moisture contents within these ranges can be used for polyisocyanate binders because they do not produce condensation products upon reacting with cellulose in the wood.

The furnish is formed into the generally flat, loosely-felted mat 52, preferably as multiple layers. A conventional dispensing system, similar to those disclosed in U.S. Pat. Nos. 3,391,223 and 3,824,058, and 4,469,216 can be used to form the felted mat 52. Generally, such a dispensing system includes trays, each having one open side, carried on an endless belt or conveyor and one or more (e.g., three) hoppers spaced above and along the belt in the direction of travel for receiving the furnish.

When a multi-layered felted mat 52 is formed, a plurality of hoppers usually are used with each having a dispensing or forming head extending across the width of the carriage for successively depositing a separate layer of the furnish as the tray is moved beneath the forming heads. Following this, the tray is taken to the mold to place the felted mat within the cavity of the bottom mold, by sliding the tray out from under the mat.

In order to produce molded wood flake parts 14 having the desired edge density characteristics without excessive blistering and springback, the felted mat should preferably have a substantially uniform thickness and the wood flakes 12 should lie substantially flat in a horizontal plane parallel to the surface of the carriage and be randomly oriented relative to each other in that plane. The uniformity of the mat thickness can be controlled by depositing two or more layers of the furnish on the carriage and metering the flow of furnish from the forming heads.

Spacing the forming heads above the carriage so the wood flakes 12 must drop about 1 to about 3 feet from the heads en route to the carriage can enhance the desired random orientation of the wood flakes 12. As the flat wood flakes 12 fall from that height, they tend to spiral downwardly and land generally flat in a random pattern. Wider wood flakes 12 within the range discussed above enhance this action. A scalper or similar device spaced above the carriage can be used to ensure uniform thickness or depth of the mat, however, such means usually tend to align the top layer of wood flakes 12, i.e., eliminate the desired random orientation. Accordingly, the thickness of the mat that would optimally have the nominal part thickness 100 preferably controlled by closely metering the flow of furnish from the forming heads. The mat thickness that would optimally have the nominal part thickness 100 used will vary depending upon such factors as the size and shape of the wood flakes 12, the particular technique used for forming the mat 52, the desired thickness and density of the molded wood flake part 14 produced, the configuration of die molded wood flake part 14, and the molding pressure to be used. However, as discussed above, the felted mats 52 will be compressed to varying thicknesses by the mold 10, due to unavoidable inconsistencies from mat 52 to mat 52, spring back of the mat 52, overcompression, or the like.

Following the production of the felted mat 52 and placement of the felted mat 52 within the cavity 30 of the mold 10, the felted mat 52 mat is compressed and cured under heat and pressure when the top mold die 16 engages the bottom mold die 18. During this molding process, the punch 22 attached to and projecting from the top mold die 16 pushes through the binder coated wood flakes 12 of the felted mat 52 and forms the hole 24 while an end of the cylindrical lower portion 34 of the punch 22 is received by the punch receiving aperture 28 in the punch receiving insert 58 of the bottom mold die 18.

The felted mat 52 is then compressed and cured between the top mold die 16 and the bottom mold 18 to become the molded wood flake part 14. After the molded wood flake part 14 is produced by the method of the present invention, any flashing and any plugs are removed by conventional means to reveal the hole or holes 24, depending upon the number of punches 22 used during the molding process. Such holes 24 are capable of receiving insertion material, such as T nuts, in an assembly line fashion.

Thus, holes 24 can be produced for a multitude of inserts, such as T nuts, having a variety of shapes and sizes, which could not have been done previously. In addition, the placement of such inserts within the molded wood flake part 14 in an assembly-line fashion improves production efficiency and reduces cost in producing such parts, which could not be done previously.

The above description is that of the preferred embodiments only. Modifications of the invention will occur to those skilled in the art and to those who make or use the invention. Therefore, it is understood that the embodiment described above is merely for illustrative purposes and not intended to limit the scope of the invention, which is defined by the following claims as interpreted according to the principles of patent law, including the Doctrine of Equivalents.

What is claimed is:

1. A mold for forming wood flakes into a molded wood flake part comprising:

a top mold die including a surface and a punch extending from the surface for forming a hole in the part; and a bottom mold die including a surface having a punch receiving aperture;

said surface of said top mold die and said surface of said bottom mold die defining a cavity therebetween;

said panch projecting, into said cavity from said surface of said top mold die, and including a tapered upper portion and a cylindrical lower portion for, forming the hole in molded parts of varying thickness, said punch including a tapered upper section defining an upper opening of a first radius in a top surface of the molded part and a cylindrical lower section defining an opening of a second radius in a bottom surface of the molded part, said tapered upper portion configured to extend sufficiently far into the molded part to facilitate withdrawal of said punch from the hole formed therein, and said cylindrical lower portion being sufficiently long that regardless of variations in part thickness, the bottom opening in the hole in each part formed will have the same second radius, defined by said lower cylindrical portion.

2. The mold as defined in claim 1, wherein:

the length of said tapered upper portion of said punch is approximately equal to the length of said cylindrical lower portion of said punch.

3. The mold as defined in claim 1, wherein:

said punch receiving aperture has a cross-sectional configuration having larger dimensions than a cross-sectional configuration of said punch such that said punch can be easily inserted into said punch receiving aperture.

4. The mold as defined in claim 3, wherein:

said punch receiving aperture includes a tapered sidewall.

5. A method of forming a molded wood flake part from wood flakes comprising:

providing a top mold die including a surface and a punch extending from the surface for forming holes in the wood flakes, said punch including a tapered upper portion and a cylindrical lower portion for forming the hole in molded parts of varying thicknesses, said punch including a tapered upper section defining an upper opening of a first radius in a top surface of the molded part and a cylindrical lower section defining an opening of a second radius in a bottom surface of the molded part, said tapered upper portion configured to extend sufficiently far into the molded part to facilitate withdrawal of said punch from the hole formed therein, and said cylindrical lower portion being sufficiently long that regardless of variations in part thickness, the bottom opening in the hole in each part formed will have the same second radius, defined by said lower cylindrical portion;

providing a bottom mold die, said surface of said top mold die and said surface of said bottom mold die being configured to define a cavity therebetween;

molding said wood flakes between said top mold die and said bottom mold die; and forming said hole in said molded wood flake part.

6. The method of forming a molded wood flake part from wood flakes as defined in claim 5, further including:

forming a loosely felted mat of said wood flakes; and depositing said mat onto said bottom mold die;

wherein said step of molding includes compressing and heating said mat between said upper mold die and said bottom mold die.

7. The method of forming, a molded wood flake part from wood flakes as defined in claim 5, further including:

providing said bottom mold die with a punch receiving aperture into which wood flakes are pressed by said punch.

8. The method of forming a molded wood flake part from wood flakes as defined in claim 7, wherein:

said punch receiving aperture has a cross-sectional configuration having larger dimensions than a cross-sectional configuration of said punch such that said punch can be easily inserted into said punch receiving aperture.

9. The method of forming a molded wood flake part from wood flakes as defined in claim 8, wherein:

said punch receiving aperture includes a tapered sidewall.

10. The method of forming a molded wood flake part from wood flakes as defined in claim 5, wherein:

the length of said tapered upper portion of said punch is approximately equal to the length of said cylindrical lower portion of said punch.

11. The method of forming a molded wood flake part from wood flakes is defined in claim 5, wherein:

said wood flakes have an average length of from about 1¼ to about 6 inches, an average thickness of from about 0.015 to about 0.25 inches, and an average width of less than the average length an no greater than about 3 inches.

* * * * *

UNITED STATES PATENT AND TRADEMARK OFFICE
CERTIFICATE OF CORRECTION

PATENT NO. : 6,843,946 B1  
DATED : January 18, 2005  
INVENTOR(S) : Bruce A. Haataja It is certified that error appears in the above-identified patent and that said Letters Patent is hereby corrected as shown below:

Column 1,  
Line 42, "tit" should be -- fit --.

Column 2,  
Line 39, "ill" should be -- in --.  
Line 42, "springs" should be -- spring --.  
Line 43, "file" should be -- the --.

Column 3,  
Line 13, "there between" should be -- therebetween --.  
Line 17, "beat" should be -- heat --.

Column 6,  
Line 39, "3/8'" should be -- 3/8'' --.  
Line 28, "round Wood" should be -- roundwood --.  
Line 30, after "total" delete ", (comma)".

Signed and Sealed this

Twenty-fourth Day of May, 2005

JON W. DUDAS  
*Director of the United States Patent and Trademark Office*